H. BODDINGTON.
COMBINED WINDOW SHUTTER AND VENTILATOR.
APPLICATION FILED MAR. 10, 1908.
952,300. Patented Mar. 15, 1910.
4 SHEETS—SHEET 1.
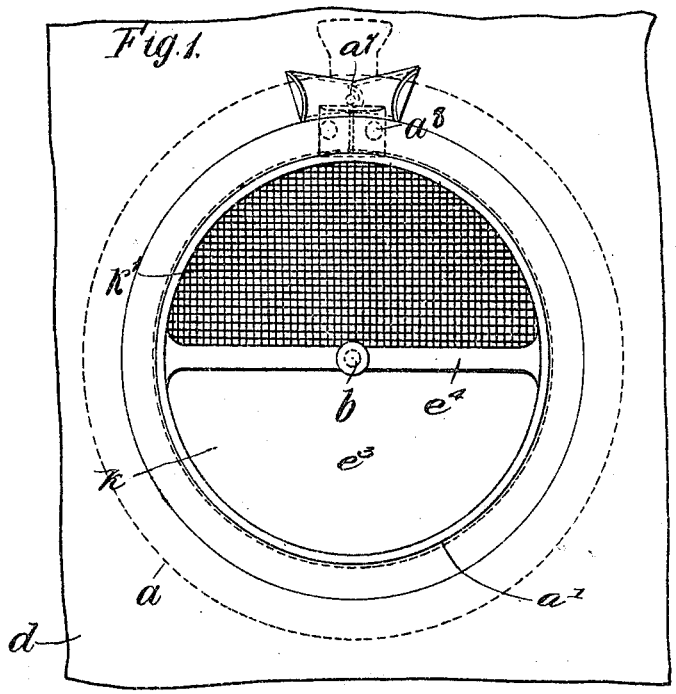
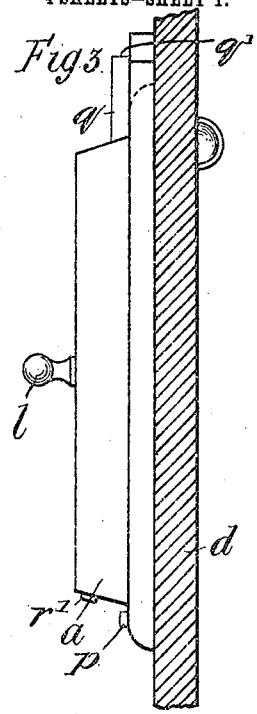
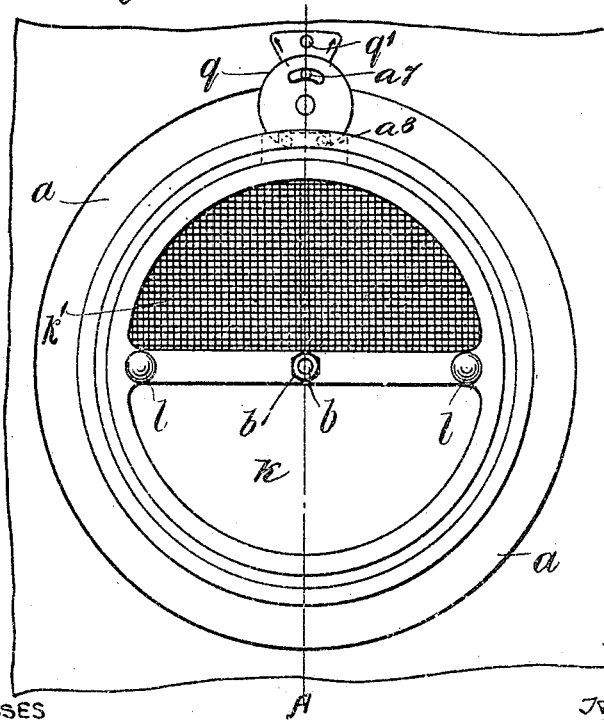
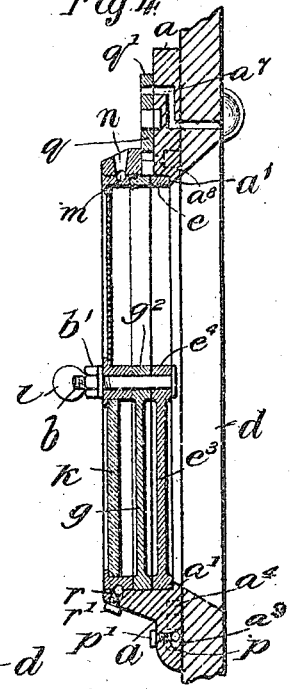
INVENTOR
Henry Boddington
BY
Howson and Howson
ATTORNEYS

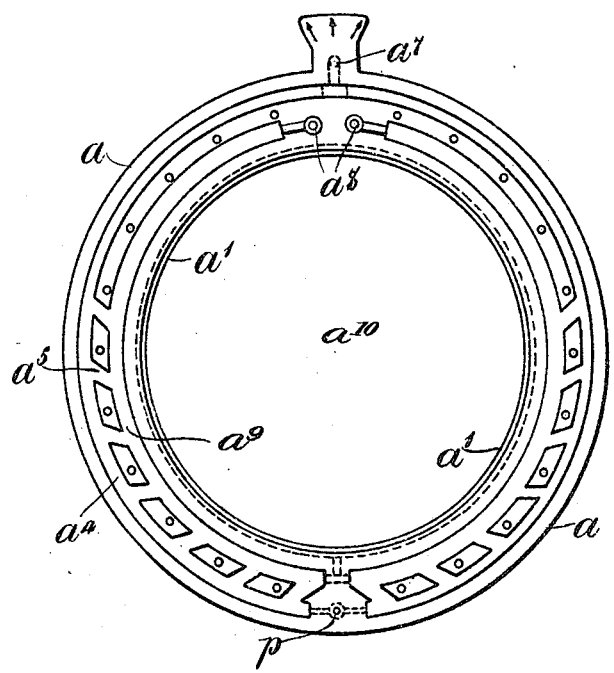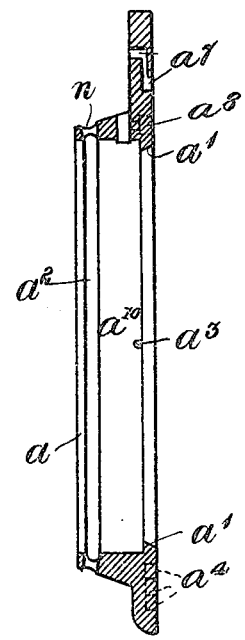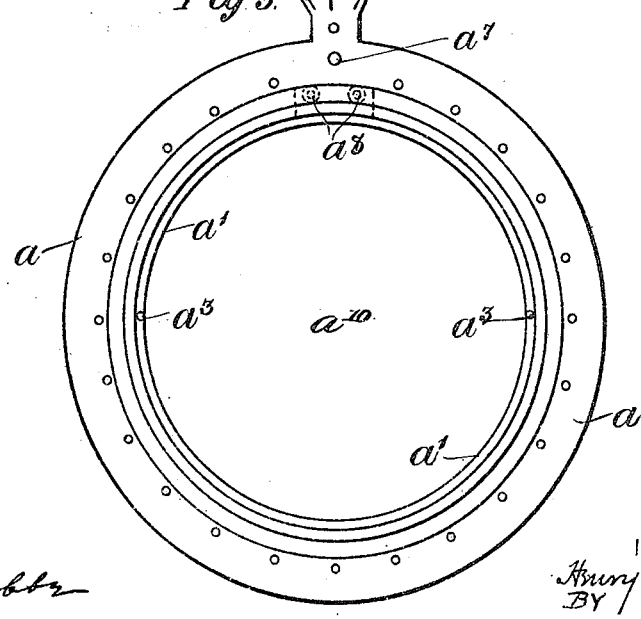

H. BODDINGTON.
COMBINED WINDOW SHUTTER AND VENTILATOR.
APPLICATION FILED MAR. 10, 1908.

952,300.

Patented Mar. 15, 1910.
4 SHEETS—SHEET 3.

WITNESSES
INVENTOR
Henry Boddington
BY
Howson and Howson
ATTORNEYS

H. BODDINGTON.
COMBINED WINDOW SHUTTER AND VENTILATOR.
APPLICATION FILED MAR. 10, 1908.

952,300.

Patented Mar. 15, 1910.
4 SHEETS—SHEET 4.

WITNESSES

INVENTOR
Henry Boddington
BY
Howson and Howson
ATTORNEYS

UNITED STATES PATENT OFFICE.

HENRY BODDINGTON, OF MANCHESTER, ENGLAND.

COMBINED WINDOW-SHUTTER AND VENTILATOR.

952,300.  Specification of Letters Patent.  Patented Mar. 15, 1910.

Application filed March 10, 1908. Serial No. 420,287.

*To all whom it may concern:*

Be it known that I, HENRY BODDINGTON, justice of the peace, a subject of the King of Great Britain and Ireland, residing at Manchester, England, have invented a new and useful Improvement for a Combined Window-Shutter and Ventilator that is especially adapted for the port-holes of ships, but is also applicable in places such as studios, dark rooms, malt-houses, stores, cellars, attics, stables, and the like, of which the following is a specification.

Figure 17:
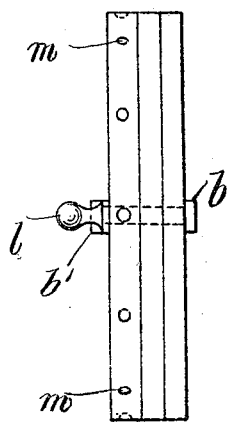
Figure 18:
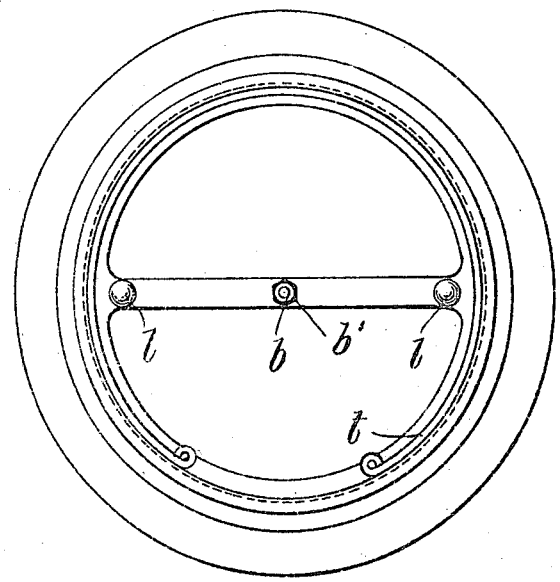

The object of my invention is to provide a simple, cheap, easily adjustable and secure arrangement that may be utilized either as a window-shutter or as a ventilator, for the purpose of obtaining air while preventing the entrance of insects such as mosquitoes, and in which the parts can be easily, quickly and accurately regulated, or removed entirely if required. This object I attain in the following manner, reference being had to the accompanying drawing in which, Figure 1, is an outside view of my invention showing it as applied to a ship, building, etc.; Fig. 2, is an inside view of the same; Fig. 3, is a side elevation of Fig. 1; Fig. 4, is a sectional elevation on the line A—A Fig. 2; Figs. 5 to 16 are views of certain of the elements constituting my invention; Fig. 17, is a view showing certain of the elements assembled, and Fig. 18, is a front elevation of a modification.

Figure 8:
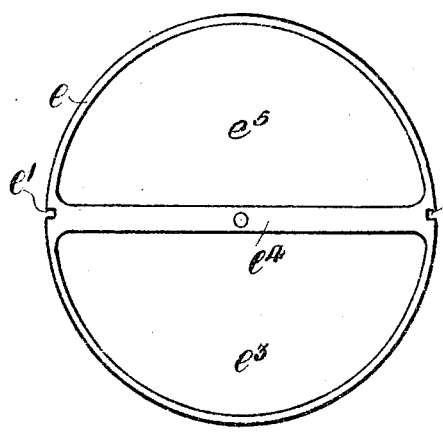
Figure 9:
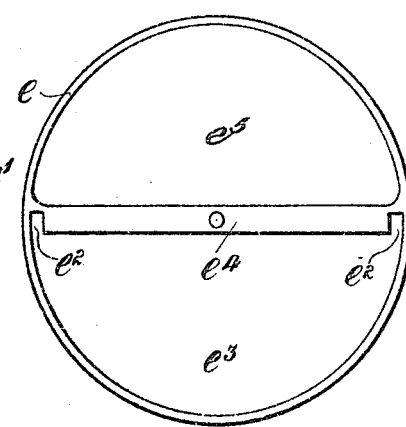
Figure 10:
Figure 11:
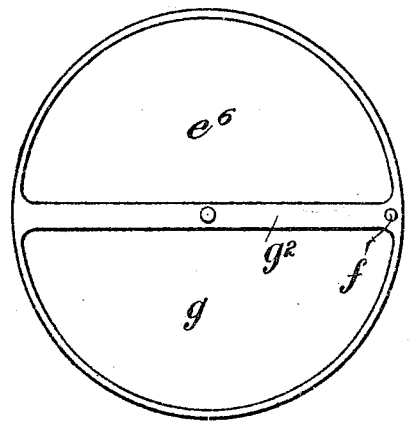
Figure 12:
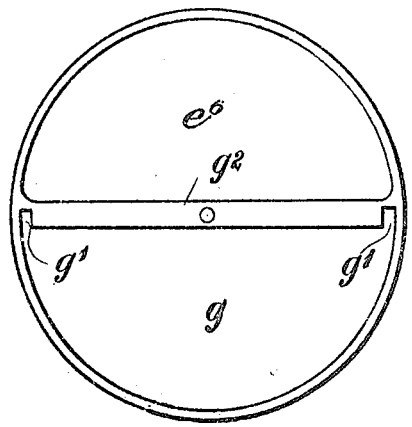
Figure 13:
Figure 14:
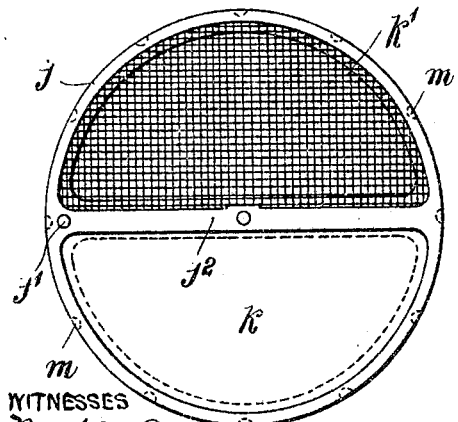
Figure 15:
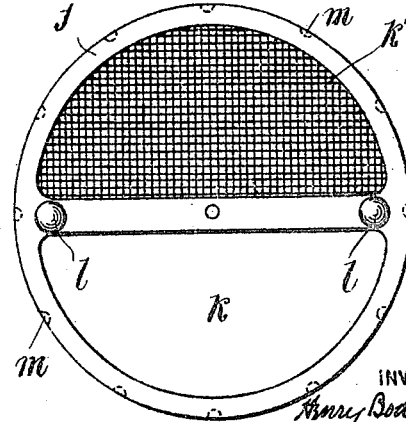
Figure 16:
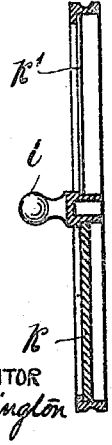

Referring to the drawings, $a$ is a circular casing or frame having an aperture $a^{10}$ and designed to be fitted in a wall, hull of a ship etc. This frame is provided with an interior rim or flange $a'$ and a ball-bearing race $a^2$. Two openings $n$ and $r$, of which the latter is normally closed by a stopper $r'$, lead to the race $a^2$ and are for the purpose of permitting the supplying of balls to and extracting them from said race. Pins $a^3$ project from the interior flange $a'$ and act as positioning means for an opaque circular partition $e^3$ having an opening $e^5$. The partition $e^3$ is slotted at $e'$, as shown in Fig. 8, and has a reinforcing rib $e^4$ which is grooved at $e^2$. A second opaque circular partition $g$ (Figs. 11, 12 and 13) having an opening $e^6$, is provided with a reinforcing rib $g^2$ from which projects a pin $f$ on one side, while the other side is grooved at $g'$.

A circular partition having cups $m$ cut in its periphery, has a division or reinforcing rib $j^2$ which is provided with a pin $j'$ on one side and handles $l$ on the other. The segment on one side of the division or reinforcement $j^2$ contains wire gauze $k'$ or other screen, while the segment on the other side of the dividing bar $j^2$ contains glass $k$. For the purpose of binding the three partitions together while permitting one to turn upon the other, I provide a bolt or pin $b$ as shown in Fig. 17.

The assembling of the various parts is accomplished in the following manner: The partition $g$ is placed against the partition $e^3$ so that the pin $f$ will project into the grooved or cut-away portion $e^2$; the partition $j$ is then placed against the partition $g$ in such manner that the pin $j'$ projects into the cut-away portion $g'$ and as each of the reinforcing members $e^4$, $g^2$ and $j^2$ is provided with a central bearing cavity, the bolt $b$ is slid through them and a nut $b'$ is screwed on the pin $b$. The casing having been previously positioned, the three partitions in their assembled form, are placed within the aperture $a^{10}$, as shown in Fig. 4, so that the pins $a^3$ on the flange $a'$ will project into the slots $e'$ in the rim of the partition $e^3$. A ball, forming part of the bearing, is then put in the opening $n$ and the ring $j$ turned by means of the handles $l$ until said ball drops into one of the cups $m$; this action is repeated until each of the cups $m$ contain a ball. These balls so placed, serve two purposes,—they act as bearing for the partitions $g$ and $j$ and they retain the latter within the casing $a$. The partition $e^3$ owing to the pins $a^3$ extending into its slots $e'$, is incapable of rotation.

In the use of my device, if it is desired to admit light and air to the room, but to exclude insects, the wire screen $k'$ should be in the position shown in Figs. 1, 2 and 4, i. e. acting as a medium between the outer atmosphere and the room. To replace the wire screen by the glass $k$ it is only necessary to turn the partition $j$ clock-wise one-half revolution. If it is desired to exclude the light at a time when the glass $k$ is the medium between the outer atmosphere and the room, it is necessary to turn the partition $j$ one full revolution, contra-clock-wise. One-half of said revolution brings the wire screen into position while the other half revolution causes the pin $j'$ to enter the groove $q'$ and turn the partition $q$ one-half revolution, at the end of which the pin $f$, by striking the groove $e^2$, prevents further movement of said partition in this direction. The partitions may be removed from the casing $a$ by allowing the balls of the bearing to drop one by one from the race $a^2$ and cups $m$ which can be done by removing the plug or stopper $r'$ and slowly turning the ring $j$. For the purpose of obtaining ventilation when it is necessary to entirely close the aperture $a^{10}$ by the glass $k$ or opaque partition $q$, I provide the casing $a$ with air channels which connect the outer and inner atmosphere. The arrangement of these channels or passages is as follows: passages $a^5$ connect two grooves $a^4$ and $a^9$. A channel $a^7$ leads from the groove $a^4$ to the outer atmosphere, while openings $a^8$ lead from the groove $a^9$ to the inner atmosphere. The groove $a^4$ is provided with a drain passage $p$ that is normally closed by a stopper $p$.

The course of the air through the channels is as follows: The air is directed by suitable funnels on the outside of the ship or building, into the channel $a^7$; from there it passes into the groove $a^4$; then through the passages $a^5$ into the groove $a^9$ and out into the room through the openings $a^8$. Any form of stop-valve can be employed for closing the openings $a^8$ into the room. As shown in the present instance, the valve $q$ consists of a plate pivoted to the casing $a$ and provided with a handle $q'$. During rainy weather or choppy seas a certain amount of water will enter the channel $a^7$ along with the air, but as it has to travel down the groove $a^4$ in order to pass through the passages $a^5$ into and up through the groove $a^9$, the water will continue down and accumulate at the bottom of the casing where it can easily be removed by withdrawing the stopper $p'$.

In the modification shown in Fig. 18, I have illustrated another construction for keeping the partitions within the casing $a$. In this modification a spring $t$ is inserted in a groove in the frame $a$ immediately in front of the ring $j$. It will be understood that instead of having the partition $e^3$ separate from the casing $a$ it may be made integral therewith.

Claims:

1. The combination of a casing having an aperture, an opaque partition fixed in and partly closing said aperture, with a second partition movably mounted in the aperture and having screened and transparent portions.

2. The combination of a casing having an aperture, an opaque partition fixed in and partly closing said aperture, a second partition movably mounted in the aperture and capable of coöperating with the first partition to wholly close the aperture, with a third partition also movably mounted in the aperture and having screened and transparent portions.

3. The combination of a casing having an aperture, an opaque partition fixed in and partly closing said aperture, a second partition movably mounted in the aperture, and capable of coöperating with the first partition to close the aperture, with a third partition having screened and transparent portions either of said portions being movable into line with the portion of the aperture not closed by the first partition.

4. The combination of a casing having an aperture, an opaque partition fixed in and partly closing said aperture, a second partition movably mounted in the aperture and capable of coöperating with the first partition to close the aperture, a third partition having screened and transparent portions, with means for moving the second partition or either portion of the third partition into line with the portion of the aperture not closed by the first partition.

5. The combination of a window frame having a circular aperture, a circular partition mounted in said aperture and having an opening, a second partition rotatably mounted in said aperture and having an opening, a third partition also rotatably mounted within the aperture and having screened and transparent portions, with coupling means between the second and third partitions whereby the rotation of one of said rotatable partitions will cause rotation of the other.

6. The combination of a window frame having a circular aperture, a circular partition removably fixed within said aperture and having an opening, a pin passing through the center of said partition, a second partition rotatably mounted on said pin and also having an opening, a third partition rotatably mounted on said pin and having a screened and a transparent portion.

7. The combination of a window frame having an aperture, a partition removably fixed within said aperture and having an opening, a pin passing through the partition, a second partition rotatably mounted on said pin and also having an opening, a third partition rotatably mounted on said pin and having a screened and a transparent portion, said frame also having an air passage opening on both faces thereof and a branch passage leading from the bottom part of said passage to permit of the escape of water.

8. The combination of a window frame having an aperture, a partition removably fixed within said aperture and having an opening, a pin passing through the partition, a second partition rotatably mounted on said pin and also having an opening, a third partition rotatably mounted on said pin and having a screened and a transparent portion, said frame also having an air passage opening on both faces thereof and a branch passage leading from the bottom
5 part of said passage to permit of the escape of water, with means for directing air to compel it to flow through the passage.

In testimony whereof I affix my signature in presence of two witnesses.

HENRY BODDINGTON.

Witnesses:
    THOS. PRESCOTT,
    HAROLD WALKER.